(12) United States Patent
Jaju et al.

(10) Patent No.: US 11,470,505 B2
(45) Date of Patent: Oct. 11, 2022

(54) SUPPORT FOR LINKING OF PACKET DETECTION RULES (PDR) FOR OPTIMIZING THROUGHPUT OF COMBINED SERVING GATEWAY (SGW)/PACKET GATEWAY (PGW) ARCHITECTURE

(71) Applicant: Parallel Wireless, Inc., Nashua, NH (US)

(72) Inventors: Ganesh Jaju, Pune (IN); Ketan Parikh, Pune (IN); Nikhil Agarwal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 14 days.

(21) Appl. No.: 17/008,422

(22) Filed: Aug. 31, 2020

(65) Prior Publication Data

US 2021/0068007 A1 Mar. 4, 2021

Related U.S. Application Data

(60) Provisional application No. 62/893,931, filed on Aug. 30, 2019.

(51) Int. Cl.
*H04W 4/00* (2018.01)
*H04W 28/06* (2009.01)
*H04L 45/74* (2022.01)

(52) U.S. Cl.
CPC .............. *H04W 28/06* (2013.01); *H04L 45/74* (2013.01)

(58) Field of Classification Search
CPC ....... H04W 28/06; H04W 76/11; H04L 45/74; H04L 12/741

(Continued)

(56) References Cited

U.S. PATENT DOCUMENTS

| 11,032,873 | B2 * | 6/2021 | Stojanovski | ........ H04L 47/2441 |
| 2006/0036518 | A1 * | 2/2006 | O'Neill | ................. H04M 15/41 |
| | | | | 705/40 |

(Continued)

FOREIGN PATENT DOCUMENTS

| CN | 112152923 A | * 12/2020 | .............. H04L 29/08 |
| WO | WO-2019228254 A1 | * 12/2019 | ........ H04W 36/0011 |

(Continued)

OTHER PUBLICATIONS

Universal Mobile Telecommunications System (UMTS); LTE; Architecture enhancements for control and user plane separation of EPC nodes (3GPP TS 23.214 version 14.2.0 Release 14), May 2017.

(Continued)

*Primary Examiner* — Mahendra R Patel
(74) *Attorney, Agent, or Firm* — Michael Y. Saji

(57) ABSTRACT

A method for linking Packet Detection Rules (PDRs) for optimizing throughput of combined Serving Gateway (SGW)/Packet Gateway (PGW) architecture is disclosed. In one embodiment the method includes, determining a SGW and a PGW are co-located on a system and when the SGW and PGW are co-located on a same system then performing a Packet Forwarding Control Protocol (PFCP) session lookup for an uplink packet at the SGW; determining which PDR to use for sending the uplink traffic; using the PDR to remove any tunneling protocol header; checking the PDR to determine if the next hop is local; when the next hop is local, then finding the PGW PDRs for this FTEID; identifying a PGW PDR matching with the current packet; performing any packet encapsulation; and after performing any optional header checksum calculations, sending the packet.

13 Claims, 7 Drawing Sheets

(58) Field of Classification Search
USPC .................................. 370/328, 329, 310.2
See application file for complete search history.

(56) References Cited

U.S. PATENT DOCUMENTS

| | | | | |
|---|---|---|---|---|
| 2011/0185049 | A1* | 7/2011 | Atreya | H04W 12/082 709/222 |
| 2012/0239966 | A1* | 9/2012 | Kompella | H04W 24/04 714/4.11 |
| 2016/0337454 | A1* | 11/2016 | Hoffmann | H04L 29/08576 |
| 2017/0126618 | A1* | 5/2017 | Bhaskaran | H04L 61/2015 |
| 2017/0151514 | A1* | 6/2017 | Kihara | B01D 39/1623 |
| 2019/0116118 | A1* | 4/2019 | Kapela | H04L 45/74 |
| 2019/0191467 | A1* | 6/2019 | Dao | H04W 60/00 |
| 2019/0313285 | A1* | 10/2019 | Gottwerth | H04L 41/0823 |
| 2019/0335534 | A1* | 10/2019 | Atari | H04M 15/66 |
| 2019/0373424 | A1* | 12/2019 | Kappla | H04W 4/24 |
| 2020/0344662 | A1* | 10/2020 | Maino | H04W 28/0268 |
| 2020/0396779 | A1* | 12/2020 | Yang | H04W 76/11 |
| 2020/0404739 | A1* | 12/2020 | Thiebaut | H04W 4/08 |
| 2021/0369506 | A1* | 12/2021 | Blevins | A61F 13/4704 |

FOREIGN PATENT DOCUMENTS

| | | | | |
|---|---|---|---|---|
| WO | WO-2019243901 | A * | 12/2019 | H04L 12/44 |
| WO | WO-2020013750 | A1 * | 1/2020 | |
| WO | WO-2020031004 | A1 * | 2/2020 | H04L 47/12 |
| WO | WO-2020069785 | A1 * | 4/2020 | H04L 12/4633 |
| WO | WO-2020119952 | A1 * | 6/2020 | H04W 28/0263 |

OTHER PUBLICATIONS

5G; System architecture for the 5G System (5GS) (3GPP TS 23.501 version 16.6.0 Release 16), Oct. 2020.

LTE; 5G; Interface between the Control Plane and the User Plane nodes (3GPP TS 29.244 version 16.5.0 Release 16), Nov. 2020.

* cited by examiner

SUPPORT FOR LINKING OF PACKET DETECTION RULES (PDR) FOR OPTIMIZING THROUGHPUT OF COMBINED SERVING GATEWAY (SGW)/PACKET GATEWAY (PGW) ARCHITECTURE

CROSS-REFERENCE TO RELATED APPLICATIONS

This application claims priority under 35 U.S.C. § 119(e) to U.S. Provisional Pat. App. No. 62/893,931, filed Aug. 30, 2019, titled "Support For Linking Of Packet Detection Rules (PDR) For Optimizing Throughput Of Combined Serving Gateway (SGW)/Packet Gateway (PGW) Architecture" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 14, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Existing behavior defined by 3GPP spec:
1. 29.244-3rd Generation Partnership Project; Technical Specification Group Core Network and Terminals; Interface between the Control Plane and the User Plane Nodes;
2. 29.214-3rd Generation Partnership Project; Technical Specification Group Services and System Aspects; Architecture enhancements for control and user plane separation of Evolved Packet Core (EPC) nodes;

SUMMARY

Systems and methods for linking Packet Detection Rules (PDR) for optimizing throughput of combined Serving Gateway (SGW)/Packet Gateway (PGW) architecture are described. Methods are disclosed for linking SGW/PGW PDRs when both the SGW & PGW are co-located in a system. The method optimizes the data-path by avoiding unnecessary hops between SGW & PGW PDRs in data flow resulting in improved throughput.

In one embodiment, a method may be disclosed for linking PDR for optimizing throughput of combined SGW/PGW architecture, the method comprising determining whether a SGW and a PGW are co-located on a system and when the SGW and PGW are co-located on a same system then performing a Packet Forwarding Control Protocol (PFCP) session lookup based on Tunnel Identifier End Point (TEID) for an uplink packet at the SGW and determining from a PDR list for the PFCP session which PDR to use for sending the uplink traffic. The method further includes using the PDR to remove any S1-U GPRS Tunneling Protocol User (GTPU) header and checking the PDR to determine if a next hop is local. The method additionally includes, when the next hop is local, then using the PGW S5-U FTEID from the corresponding SGW forwarding Action Rule (FAR) to find the PGW PDRs for this FTEID and based on the PDR precedence, and identifying a PGW PDR matching with the current packet. The method further includes using the PGW FAR pointed out by selected PGW PDR, performing any SGi specific packet encapsulation, and after performing any optional header checksum calculations, sending the packet out of PGW over SGi.

In another embodiment, a method for linking Packet Detection Rules (PDRs) for optimizing throughput of combined Serving Gateway (SGW)/Packet Gateway (PGW) architecture includes determining a SGW and a PGW are co-located on a system and when the SGW and PGW are co-located on a same system then performing a PFCP session lookup based on User Equipment (UE) Internet Protocol (IP) for an downlink packet at the PGW. The method also includes identifying a PGW PDR based on PDR precedence and using the PDR to remove any SGi specific packet headers. The method additionally includes checking the PDR to determine if the next hop is local and when the next hop is local, then using the SGW S5-U FTEID from the corresponding SGW FAR to find the SGW PDRs for this FTEID. The method further includes using the SGW FAR pointed out by selected SGW PDR, performing SGi GTPU header encapsulation and after performing outer IP/UDP checksum calculations, sending the packet out of SGW over S1-U.

DETAILED DESCRIPTION

Although the systems and methods are described in reference to various radio wireless standards, one of skill in the art would understand that these systems and methods could be adapted for use with other wireless standards or versions thereof. The inventors have understood and appreciated that the present disclosure could be used in conjunction with various network architectures and technologies. Wherever a particular technology is described, the inventors have understood that other RATs have similar equivalents, such as a gNodeB for 5G equivalent of eNB. The following description applies to radio access technologies, including but not limited to 5G, specifically, to (1) 5G non-standalone using a PGW/SGW in the core network for 5G-RAN-originated packets; (2) 5G standalone, with 5G next-gen core (5G NGC), session management function (SMF), and user plane function (UPF), with user plane sessions being processed by UPF and control plane sessions handled by SMF.

Figure 1:
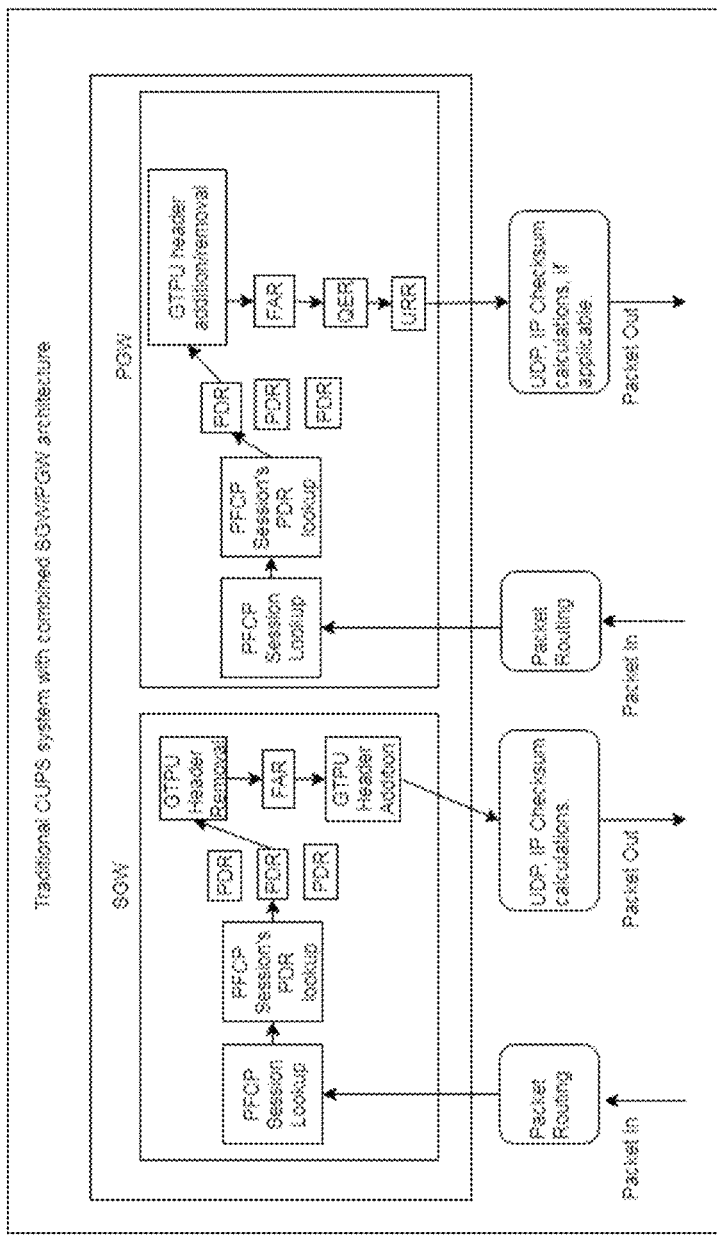
FIG. 1 is a diagram showing Control Plane User Plane Separation (CUPS) system with a combined SGW/PGW architecture, as is known in the art.

FIG. 1 shows a traditional CUPS system 100 with SGW/PGW architecture. The system 100 includes SGW/PGW 101 which includes an SGW 102 and a PGW 103.

TABLE 1

| Create PDR IE within PFCP Session Establishment Request | | | | | | |
|---|---|---|---|---|---|---|
| Information | | | Appl. | | | |
| elements | P | Condition/Comment | Sx a | Sx b | Sx c | N4 IE Type |
| PDR ID | M | This IE shall uniquely identify the PDR among all the PDRs configured for that PFCP session. | X | X | X | X PDR ID |
| Precedence | M | This IE shall indicate the PDR's precedence to be applied by the UP function among all PDRs of the PFCP session, when looking for a PDR matching an incoming packet. | — | X | X | X Precedence |
| PDI | M | This IE shall contain the PDI against which incoming packets will be matched. See Table 7.5.2.2-2. | X | X | X | X PDI |
| Outer Header Removal | C | This IE shall be present if the UP function is required to remove one or more outer header(s) from the packets matching this PDR. | X | X | — | X Outer Header Removal |
| FAR ID | C | This IE shall be present if the Activate Predefined Rules IE is not included or if it is included but it does not result in activating a predefined FAR, and if the MAR ID is not included. When present this IE shall contain the FAR ID to be associated to the PDR. | X | X | X | X FAR ID |
| URR ID | C | This IE shall be present if a measurement action shall be applied to packets matching this PDR. When present, this IE shall contain the URR IDs to be associated to the PDR. Several IEs within the same IE type may be present to represent a list of URRs to be associated to the PDR. | X | X | X | X URR ID |
| QER ID | C | This IE shall be present if a QoS enforcement or QoS marking action shall be applied to packets matching this PDR. When present, this IE shall contain the QER IDs to be associated to the PDR. Several IEs within the same IE type may be present to represent a list of QERs to be associated to the PDR. | — | X | X | X QER ID |
| Activate Predefined Rules | C | This IE shall be present if Predefined Rule(s) shall be activated for this PDR. When present this IE shall contain one Predefined Rules name. Several IEs with the same IE type may be present to represent multiple "Activate Predefined Rules" names. | — | X | X | X Activate Predefined Rules |
| Activation Time | O | This IE may be present if the PDR activation shall be deferred. (NOTE 1) | — | X | X | X Activation Time |
| Deactivation Time | O | This IE may be present if the PDR deactivation shall be deferred. (NOTE 1) | — | X | X | X Deactivation Time |
| MAR ID | C | This IE shall be present if the PDR is provisioned to match the downlink traffic towards the UE for a PFCP session established for a MA PDU session. | — | — | — | X MAR ID |

NOTE 1:
When the Activation Time and Deactivation Time are not present, the PDR shall be activated immediately at receiving the message.

TABLE 2

Update PDR IE within PFCP Session Modification Request

| Information elements | P | Condition/Comment | Sx a | Sx b | Sx c | N4 | Appl. IE Type |
|---|---|---|---|---|---|---|---|
| PDR ID | M | This IE shall uniquely identify the PDR among all the PDRs configured for that PFCP session. | X | X | X | X | PDR ID |
| Outer Header Removal | C | This IE shall be present if it needs to be changed. | X | X | — | X | Outer Header Removal |
| Precedence | C | This IE shall be present if there is a change in the PDR's precedence to be applied by the UP function among all PDRs of the PFCP session, when looking for a PDR matching an incoming packet. | — | X | X | X | Precedence |
| PDI | C | This IE shall be present if there is a change within the PDI against which incoming packets will be matched. When present, this IE shall replace the PDI previously stored in the UP function for this PDR. See Table 7.5.2.2-2. | X | X | X | X | PDI |
| FAR ID | C | This IE shall be present if it needs to be changed | X | X | X | X | FAR ID |
| URR ID | C | This IE shall be present if a measurement action shall be applied or no longer applied to packets matching this PDR. When present, this IE shall contain the list of all the URR IDs to be associated to the PDR. | X | X | X | X | URR ID |
| QER ID | C | This IE shall be present if a QoS enforcement action shall be applied or no longer applied to packets matching this PDR. When present, this IE shall contain the list of all the QER IDs to be associated to the PDR. | — | X | X | X | QER ID |
| Activate Predefined Rules | C | This IE shall be present if new Predefined Rule(s) needs to be activated for the PDR. When present this IE shall contain one Predefined Rules name. Several IEs with the same IE type may be present to represent multiple "Activate Predefined Rules" names. | — | X | X | X | Activate Predefined Rules |
| Deactivate Predefined Rules | C | This IE shall be present if Predefined Rule(s) needs to be deactivated for the PDR. When present this IE shall contain one Predefined Rules name. Several IEs with the same IE type may be present to represent multiple "Activate Predefined Rules" names. | — | X | X | X | Deactivate Predefined Rules |
| Activation Time | O | This IE may be present if the PDR activation time shall be changed. (NOTE 2) | — | X | X | X | Activation Time |
| Deactivation Time | O | This IE may be present if the PDR deactivation time shall be changed. (NOTE 2) | — | X | X | X | Deactivation Time |

NOTE 1:
The IEs which do not need to be modified shall not be included in the Update PDR IE. The UP function shall continue to behave according to the values previously received for IEs not present in the Update PDR IE.
NOTE 2:
When the Activation Time and Deactivation Time are not present, the PDR shall keep its current activation status, either active or inactive.

Currently, a combined SGW/PGW architecture supporting CUPS functions in following manner:

Uplink traffic flow

At SGW

The uplink packet first lands on SGW which does a PFCP session lookup based on TEID.

Once the PFCP session is found, it looks through its PDR list to decide which PDR to use for sending the uplink traffic.

Once the PDR is found, it is used to remove the S1-U GTPU header.

Using the FAR pointed out by selected PDR, S5-U GTPU header encapsulation is done.

Then after doing the outer IP/UDP checksum calculations, the packet is sent out of SGW. The module handling data-path (kernel or DPDK or NPU or anything else) determines that the packet is destined to same host and forwards it to PGW.

At PGW

The uplink packet then lands on PGW which again does a PFCP session lookup based on TED.

Once the PFCP session is found, it looks through its PDR list in precedence order to decide which PDR to use for sending the uplink traffic.

Once the PDR is found, it is used to remove the S5-U GTPU header.

Using the FAR pointed out by selected PDR, any SGi specific packet encapsulation, if any, is done.

After any optional header checksum calculations, the packet is sent out of PGW. The module handling data-path (kernel or DPDK or NPU or anything else) determines that the packet is destined to outside the system and routes packet out.

Downlink traffic flow

At PGW

The downlink packet first lands on PGW which does a PFCP session lookup based on UE IP.

Once the PFCP session is found, it looks through its PDR list in precedence order to decide which PDR to use for sending the downlink traffic.

Once the PDR is found, it is used to remove SGi specific packet headers, if any.

Using the FAR pointed out by selected PDR, S5-U GTPU header encapsulation is done.

Then after doing the outer IP/UDP checksum calculations, the packet is sent out of PGW. The module handling data-path (kernel or DPDK or NPU or anything else) determines that the packet is destined to same host and so routes it back to PGW.

SGW

The uplink packet then lands on SGW which again does a PFCP session lookup based on TED.

Once the PFCP session is found, it looks through its PDR list to decide which PDR to use for sending the uplink traffic.

Once the PDR is found, it is used to remove the S1-U GTPU header

Using the FAR pointed out by selected PDR, S5-U GTPU header encapsulation is done.

Then after doing the outer IP/UDP checksum calculations, the packet is sent out of SGW. The module handling data-path (kernel or DPDK or NPU or anything else) determines that the packet is destined to outside the system and routes the packet out on S1-U.

As per above flow, following overlapping functionalities of SGW & PGW are performed at the User-Plane node even in case when services are co-located.

Multiple PFPC session lookups both at PGW and SGW.

Unnecessary S5-U GTPU header addition & removal over S5 interface.

IP & UDP checksum calculations after S5-U GPTU encapsulation.

Routing of packet from SGW to PGW.

The present method and system for linking of PDR for optimizing throughput of combined SGW/PGW architecture

TABLE 3

| Create PDR IE within PFCP Session Establishment Request | | | | | | | |
|---|---|---|---|---|---|---|---|
| Information elements | P | Condition/Comment | Appl. Sx a | Sx b | Sx c | N4 | IE Type |
| PDR ID | M | This IE shall uniquely identify the PDR among all the PDRs configured for that PFCP session. | X | X | X | X | PDR ID |
| Precedence | M | This IE shall indicate the PDR's precedence to be applied by the UP function among all PDRs of the PFCP session, when looking for a PDR matching an incoming packet. | — | X | X | X | Precedence |
| PDI | M | This IE shall contain the PDI against which incoming packets will be matched. See Table 7.5.2.2-2. | X | X | X | X | PDI |
| Outer Header Removal | C | This IE shall be present if the UP function is required to remove one or more outer header(s) from the packets matching this PDR. | X | X | — | X | Outer Header Removal |
| FAR ID | C | This IE shall be present if the Activate Predefined Rules IE is not included or if it is included but it does not result in activating a predefined FAR, and if the MAR ID is not included. When present this IE shall contain the FAR ID to be associated to the PDR. | X | X | X | X | FAR ID |
| URR ID | C | This IE shall be present if a measurement action shall be applied to packets matching this PDR. When present, this IE shall contain the URR IDs to be associated to the PDR. Several IEs within the same IE type may be present to represent a list of URRs to be associated to the PDR. | X | X | X | X | URR ID |
| QER ID | C | This IE shall be present if a QoS enforcement or QoS marking action shall be applied to packets matching this PDR. When present, this IE shall contain the QER IDs to be associated to the PDR. Several IEs within the same IE type may be present to represent a list of QERs to be associated to the PDR. | — | X | X | X | QER ID |
| Activate Predefined Rules | C | This IE shall be present if Predefined Rule(s) shall be activated for this PDR. When present this IE shall contain one Predefined Rules name. Several IEs with the same IE type may be present to represent multiple "Activate Predefined Rules" names. | — | X | X | X | Activate Predefined Rules |
| Activation Time | O | This IE may be present if the PDR activation shall be deferred. (NOTE 1) | — | X | X | X | Activation Time |
| Deactivation Time | O | This IE may be present if the PDR deactivation shall be deferred. (NOTE 1) | — | X | X | X | Deactivation Time |
| MAR ID | C | This IE shall be present if the PDR is provisioned to match the downlink traffic towards the UE for a PFCP session established for a MA PDU session. | — | — | — | X | MAR ID |
| Next Hop | O | This IE may be present if the next hop information is to be provided indicating linking of PDRs. | X | X | X | X | Next Hop |

NOTE 1:
When the Activation Time and Deactivation Time are not present, the PDR shall be activated immediately at receiving the message.

TABLE 4

Update PDR IE within PFCP Session Modification Request

| Information elements | P | Condition/Comment | Sx a | Sx b | Sx c | N4 | IE Type |
|---|---|---|---|---|---|---|---|
| PDR ID | M | This IE shall uniquely identify the PDR among all the PDRs configured for that PFCP session. | X | X | X | X | PDR ID |
| Outer Header Removal | C | This IE shall be present if it needs to be changed. | X | X | — | X | Outer Header Removal |
| Precedence | C | This IE shall be present if there is a change in the PDR's precedence to be applied by the UP function among all PDRs of the PFCP session, when looking for a PDR matching an incoming packet. | — | X | X | X | Precedence |
| PDI | C | This IE shall be present if there is a change within the PDI against which incoming packets will be matched. When present, this IE shall replace the PDI previously stored in the UP function for this PDR. See Table 7.5.2.2-2. | X | X | X | X | PDI |
| FAR ID | C | This IE shall be present if it needs to be changed | X | X | X | X | FAR ID |
| URR ID | C | This IE shall be present if a measurement action shall be applied or no longer applied to packets matching this PDR. When present, this IE shall contain the list of all the URR IDs to be associated to the PDR. | X | X | X | X | URR ID |
| QER ID | C | This IE shall be present if a QoS enforcement action shall be applied or no longer applied to packets matching this PDR. When present, this IE shall contain the list of all the QER IDs to be associated to the PDR. | — | X | X | X | QER ID |
| Activate Predefined Rules | C | This IE shall be present if new Predefined Rule(s) needs to be activated for the PDR. When present this IE shall contain one Predefined Rules name. Several IEs with the same IE type may be present to represent multiple "Activate Predefined Rules" names. | — | X | X | X | Activate Predefined Rules |
| Deactivate Predefined Rules | C | This IE shall be present if Predefined Rule(s) needs to be deactivated for the PDR. When present this IE shall contain one Predefined Rules name. Several IEs with the same IE type may be present to represent multiple "Activate Predefined Rules" names. | — | X | X | X | Deactivate Predefined Rules |
| Activation Time | O | This IE may be present if the PDR activation time shall be changed. (NOTE 2) | — | X | X | X | Activation Time |
| Deactivation Time | O | This IE may be present if the PDR deactivation time shall be changed. (NOTE 2) | — | X | X | X | Deactivation Time |
| Next Hop | O | This IE may be present if the next hop information is to be provided indicating linking of PDRs. | X | X | X | X | Next Hop |

NOTE 1:

The IEs which do not need to be modified shall not be included in the Update PDR IE. The UP function shall continue to behave according to the values previously received for IEs not present in the Update PDR IE.

NOTE 2:

When the Activation Time and Deactivation Time are not present, the PDR shall keep its current activation status, either active or inactive.

The "Next Hop" IE type shall be encoded as shown below. It indicates the type of the next hop when dealing with an incoming packet.

FIG.: Next Hop

| Bits | | | | | | | |
|---|---|---|---|---|---|---|---|
| 8 | 7 | 6 | 5 | 4 | 3 | 2 | 1 |
| | | | Type = 20 (decimal) | | | | |
| | | | Length = n | | | | |
| Spare | | | | Next Hop value | | | |

The Next Hop value shall be encoded as a 4 bits binary integer as specified in table below

TABLE

Next Hop value

| Interface value | Values (Decimal) |
|---|---|
| Remote | 0 |
| Local | 1 |

Figure 2:
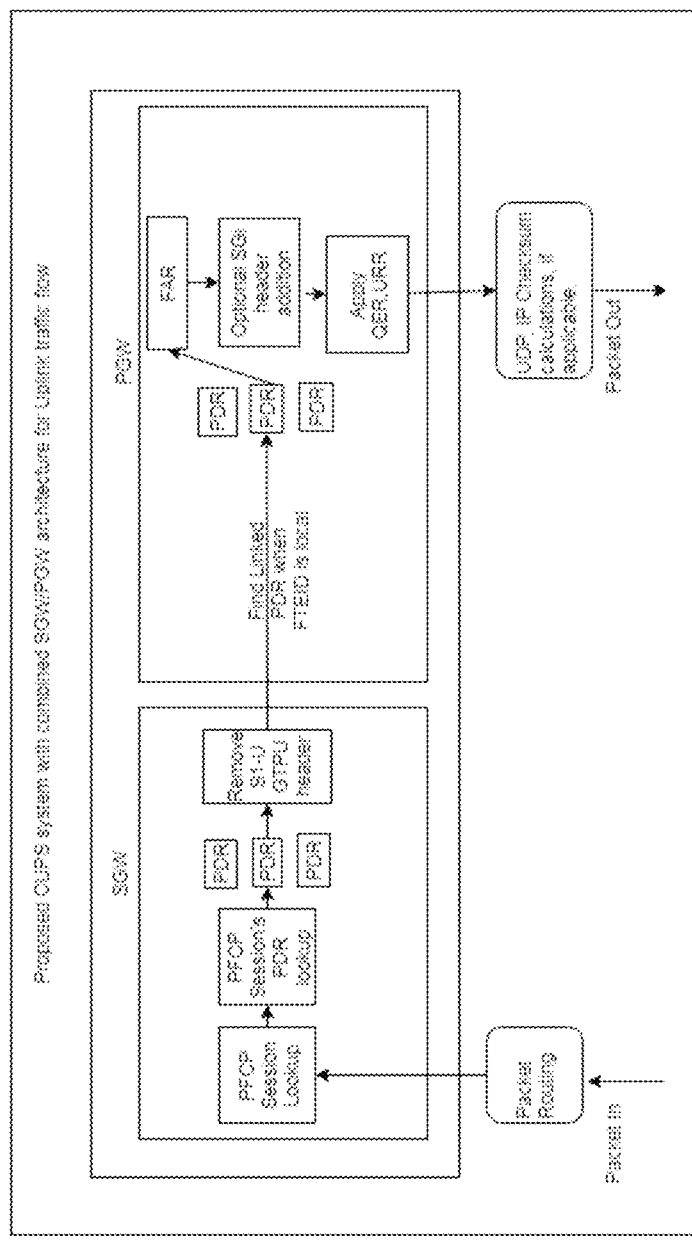
FIG. 2 is diagram showing CUPS system with a combined SGW/PGW architecture for Uplink traffic flow, in accordance with some embodiments.

The proposed architecture handles the data-path in following manner:

Uplink—FIG. 2 shows the CUPS system 200 with combined SGW/PGW architecture 201 for Uplink traffic flow. The system 200 includes combined SGW/PGW 201 which includes an SGW 202 and a PGW 203.

SGW+PGW

The uplink packet first lands on SGW which does a PFCP session lookup based on TEID.

Once the PFCP session is found, it looks through its PDR list to decide which PDR to use for sending the uplink traffic.

Once the PDR is found, it is used to remove any S1-U GTPU header.

Then, the PDR is checked to see if the "Next Hop" i.e. PGW is "Local". If yes, it simply uses the PGW S5-U FTEID from the corresponding SGW FAR to find the PGW PDRs for this FTEID.

Based on the PDR precedence, PGW PDR matching with the current packet is identified.

Using the PGW FAR pointed out by selected PGW PDR, any SGi specific packet encapsulation, if any, is done.

After any optional header checksum calculations, the packet is sent out of PGW over SGi. The module handling data-path (kernel or DPDK or NPU or anything else) determines that the packet is destined to outside the system and routes the packet out.

Figure 3:
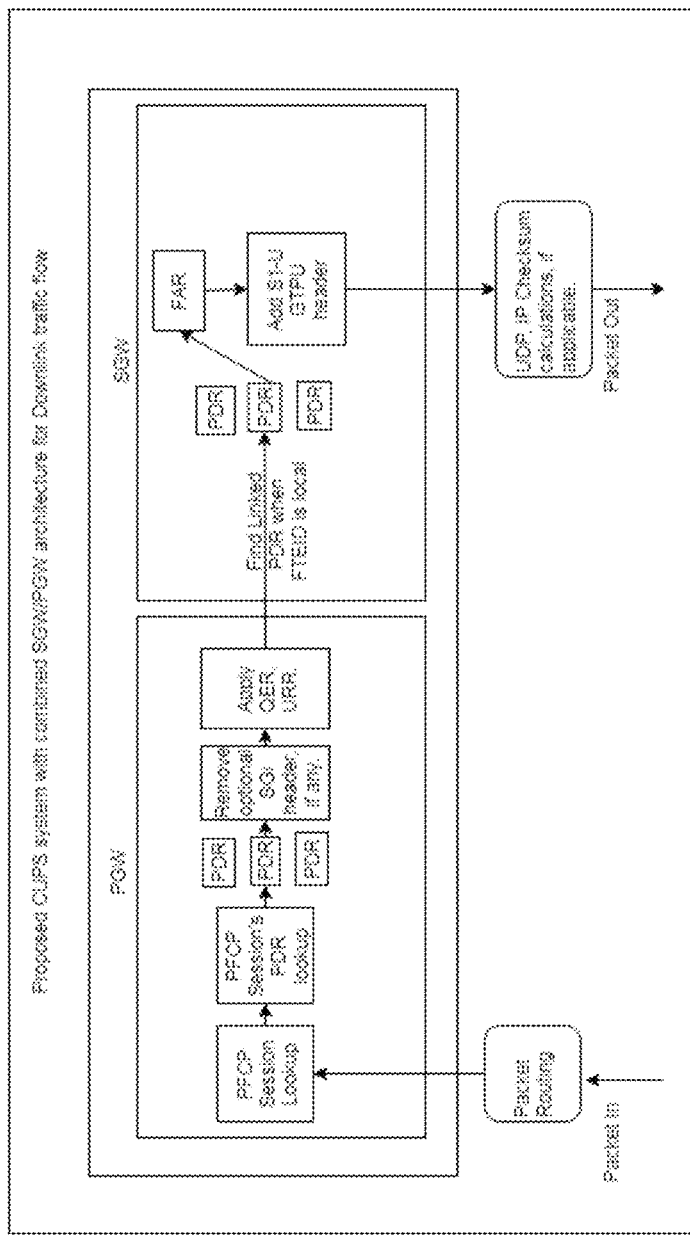
FIG. 3 is diagram showing CUPS system with a combined SGW/PGW architecture for Downlink traffic flow, in accordance with some embodiments.

Downlink—FIG. 3 shows the proposed CUPS system 300 with combined SGW/PGW architecture for Downlink traffic flow. FIG. 3 shows the CUPS system 300 with combined SGW/PGW architecture 301 for downlink traffic flow. The system 300 includes combined SGW/PGW 301 which includes an SGW 302 and a PGW 303

PGW+SGW

The downlink packet first lands on PGW which does a PFCP session lookup based on UE IP.

Based on the PDR precedence, PGW PDR matching with the current packet is identified.

Once the matching PGW PDR is found, it is used to remove any SGi specific packet headers, if any.

Then, the PGW PDR is checked to see if the "Next Hop" i.e. SGW is "Local". If yes, it simply uses the SGW S5-U FTEID from the corresponding PGW-FAR to find the SGW PDRs for this FTEID. SGW has a single PDR per bearer per direction and so, it uses that SGW PDR directly.

Using the SGW FAR pointed out by selected SGW PDR, S1-U GTPU header encapsulation is done.

Then after doing the outer IP/UDP checksum calculations, the packet is sent out of SGW over S1-U. The module handling data-path (kernel or DPDK or NPU or anything else) determines that the packet is destined to outside the system and routes the packet out.

The proposed solution optimizes the throughput when SGW & PGW are combined as below:

Single PFPC session lookup is performed across PGW and SGW.

S5-U GTPU header addition & removal is no more required over the S5 interface.

IP & UDP checksum calculations are no more required over S5-U interface.

Routing of packet from SGW to PGW is no more needed. It is achieved via the linked PDR information i.e. "Next Hop"="Local".

Figure 4:
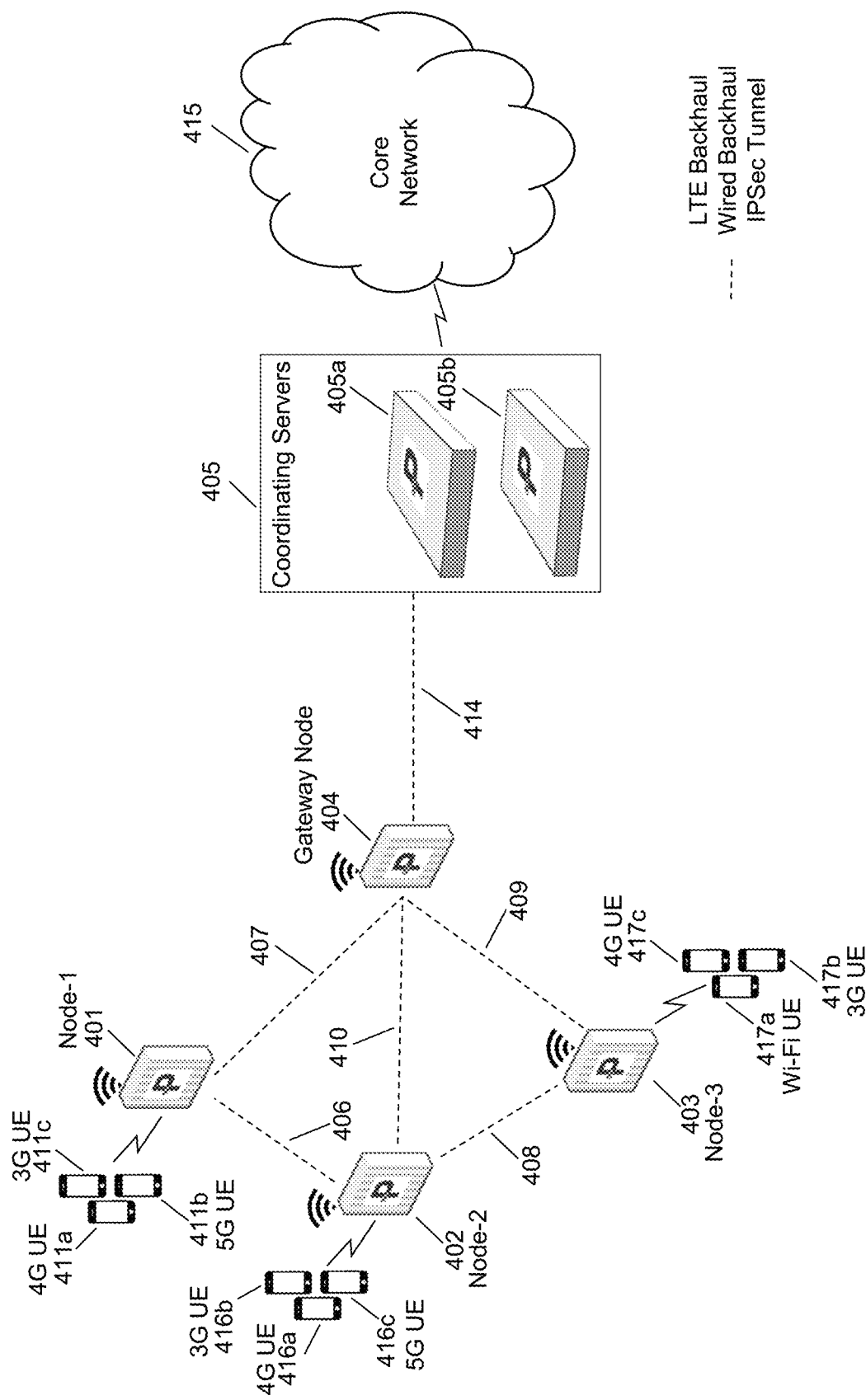
FIG. 4 is a mesh network diagram, in accordance with some embodiments.

FIG. 4 a network diagram in accordance with some embodiments. In some embodiments, as shown in FIG. 4, a mesh node 1 401, a mesh node 2 402, and a mesh node 3 403 are any G RAN nodes. Base stations 101, 402, and 403 form a mesh network establishing mesh network links 406, 407, 408, 409, and 410 with a base station 404. The mesh network links are flexible and are used by the mesh nodes to route traffic around congestion within the mesh network as needed. The base station 404 acts as gateway node or mesh gateway node, and provides backhaul connectivity to a core network to the base stations 401, 402, and 403 over backhaul link 414 to a coordinating server(s) 405 and towards core network 415. The Base stations 401, 402, 403, 404 may also provide eNodeB, NodeB, Wi-Fi Access Point, Femto Base Station etc. functionality, and may support radio access technologies such as 2G, 3G, 4G, 5G, Wi-Fi etc. The base stations 401, 402, 403 may also be known as mesh network nodes 401, 402, 403.

The coordinating servers 405 are shown as two coordinating servers 405a and 405b. The coordinating servers 405a and 405b may be in load-sharing mode or may be in active-standby mode for high availability. The coordinating servers 405 may be located between a radio access network (RAN) and the core network and may appear as core network to the base stations in a radio access network (RAN) and a single eNodeB to the core network, i.e., may provide virtualization of the base stations towards the core network. As shown in FIG. 4, various user equipments 411a, 411b, 411c are connected to the base station 401. The base station 401 provides backhaul connectivity to the user equipments 411a, 411b, and 411c connected to it over mesh network links 406, 407, 408, 409, 410 and 414. The user equipments may be mobile devices, mobile phones, personal digital assistant (PDA), tablet, laptop etc. The base station 402 provides backhaul connection to user equipments 412a, 412b, 412c and the base station 403 provides backhaul connection to user equipments 413a, 413b, and 413c. The user equipments 411a, 411b, 411c, 412a, 412b, 412c, 413a, 413b, 413c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 411a, 411b, 411c, 412a, 412b, 412c, 413a, 413b, and 413c, the uplink 414 may get congested under certain circumstances. As described above, to continue the radio access network running and providing services to the user equipments, the solution requires prioritizing or classifying the traffic based at the base stations 401, 402, 403. The traffic from the base stations 401, 402, and 403 to the core network 415 through the coordinating server 405 flows through an IPSec tunnel terminated at the coordinating server 405. The mesh network nodes 401, 402, and 403 adds IP Option header field to the outermost IP Header (i.e., not to the pre-encapsulated packets). The traffic may from the base station 401 may follow any of the mesh network link path such as 407, 406-110, 406-108-109 to reach to the mesh gateway node 404, according to a mesh network routing protocol.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

Figure 5:
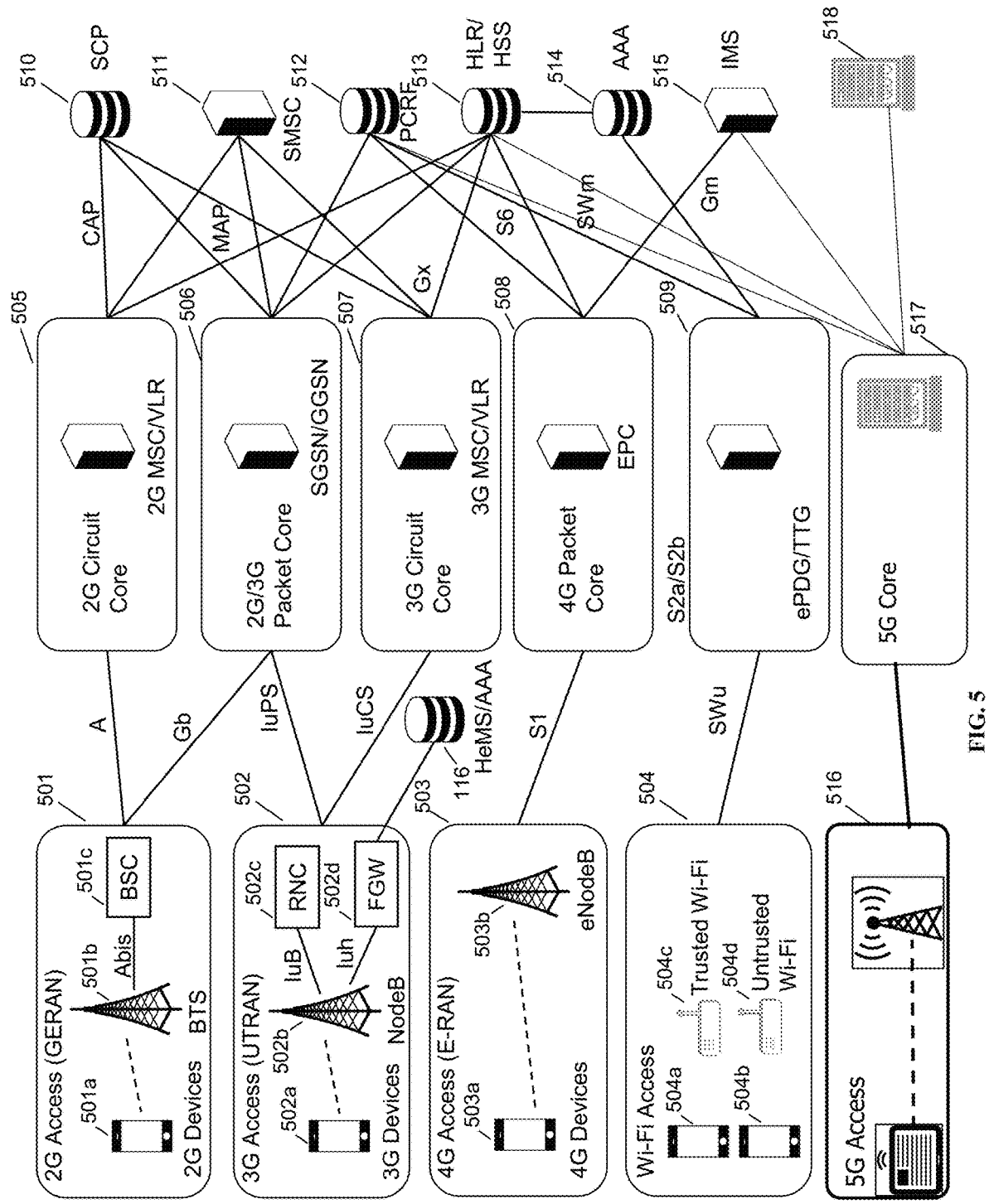
FIG. 5 is a schematic network architecture diagram for 3G and other-G networks, in accordance with some embodiments.

FIG. 5 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 501a, BTS 501b, and BSC 501c. 3G is represented by UTRAN 502, which includes a 3G UE 502a, nodeB 502b, RNC 502c, and femto gateway (FGW, which in 3GPP namespace is also known as a Home nodeB Gateway or HNBGW) 502d. 4G is represented by EUTRAN or E-RAN 503, which includes an LTE UE 503a and LTE eNodeB 503b. Wi-Fi is represented by Wi-Fi access network 504, which includes a trusted Wi-Fi access point 504c and an untrusted Wi-Fi access point 504d. The Wi-Fi devices 504a and 504b may access either AP 504c or 504d. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501c is required for Abis compatibility with BTS 501b, while for the 3G UTRAN, an RNC 502c is required for Iub compatibility and an FGW 502d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 6:
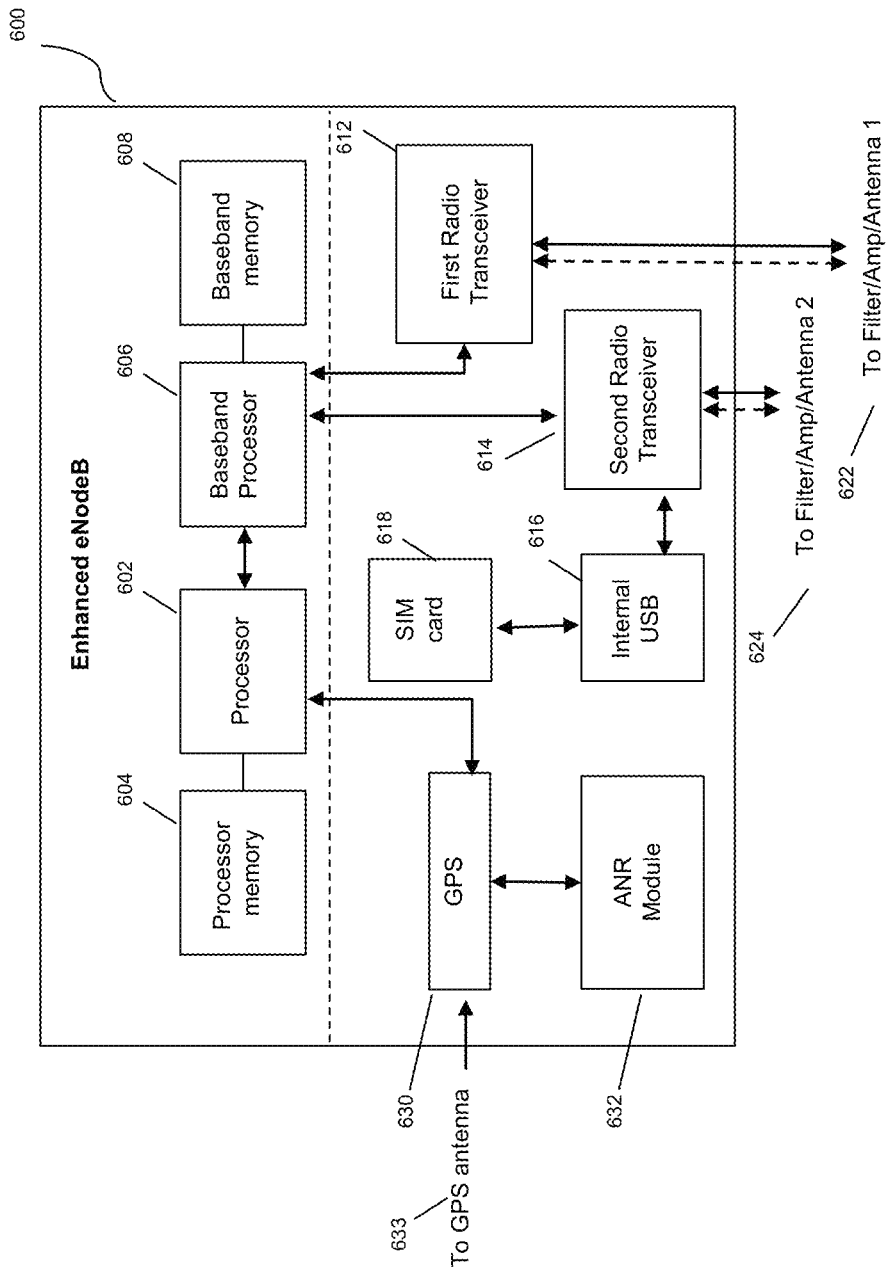
FIG. 6 eNodeB is a block diagram of an enhanced eNodeB, in accordance with some embodiments.

FIG. 6 is an enhanced eNodeB for performing the methods described herein, in accordance with some embodiments. Mesh network node 500 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
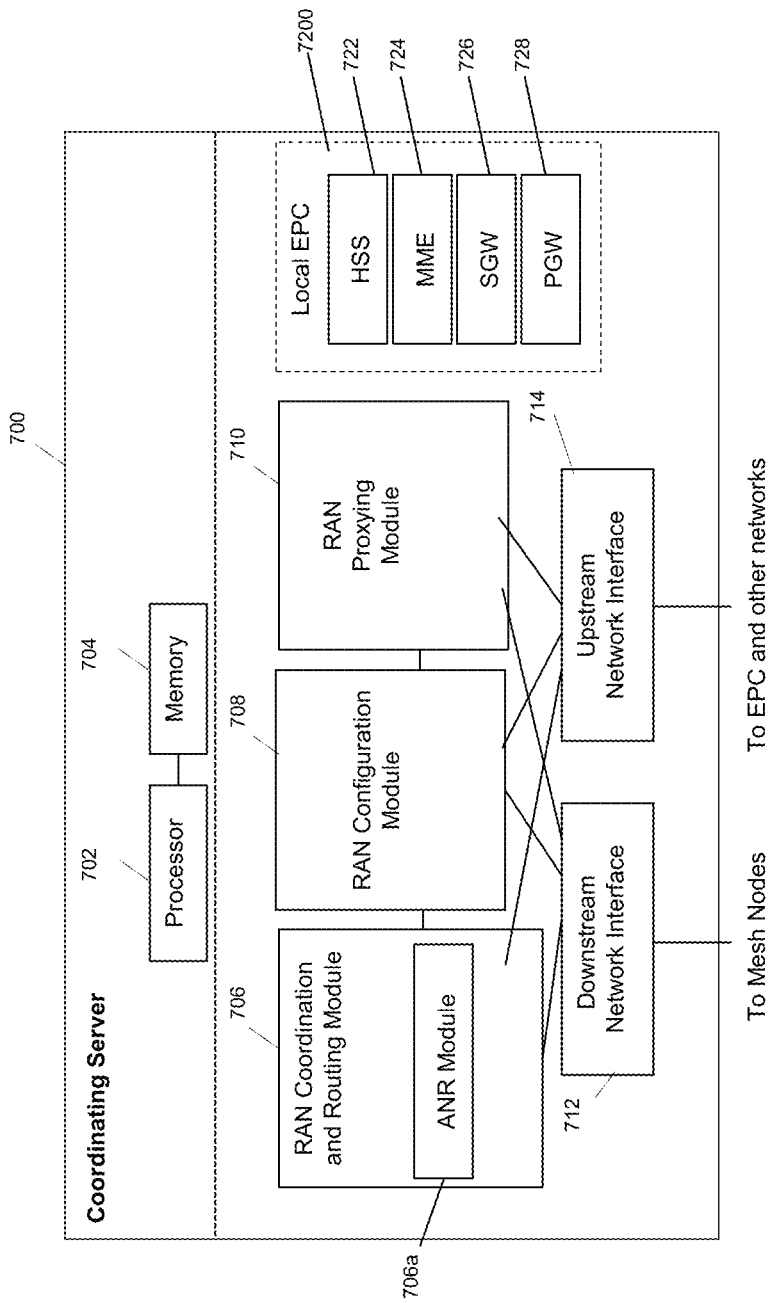
FIG. 7 is a block diagram of a coordinating server, in accordance with some embodiments.

FIG. 7 is a coordinating server for providing services and performing methods as described herein, in accordance with some embodiments. Coordinating server 700 includes processor 702 and memory 704, which are configured to provide the functions described herein. Also present are radio access network coordination/routing (RAN Coordination and routing) module 706, including ANR module 706a, RAN configuration module 708, and RAN proxying module 710. The ANR module 706a may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

In some embodiments the system may include a HetNet Gateway (HNG), and may also include a multi-RAT network and a multi-RAT core.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for linking Packet Detection Rules (PDRs) for optimizing throughput of combined Serving Gateway (SGW)/Packet Gateway (PGW) architecture, the method comprising:
    determining a SGW and a PGW are co-located on a system and when the SGW and PGW are co-located on a same system then performing a Packet Forwarding Control Protocol (PFCP) session lookup for an uplink packet at the SGW, wherein performing a Packet Forwarding Control Protocol (PFCP) session lookup includes performing a Packet Forwarding Control Protocol (PFCP) session lookup based on a Tunnel End Point Identifier (TEID);
    determining which PDR to use for sending the uplink traffic;
    using the PDR to remove any tunneling protocol header;
    checking the PDR to determine if the next hop is local;
    when the next hop is local, then finding the PGW PDRs for a Tunnel End Point Identifier (TEID);
    identifying a PGW PDR matching with the current packet;
    performing any packet encapsulation; and
    after performing any optional header checksum calculations, sending the packet.

2. The method of claim 1 wherein determining which PDR to use for sending the uplink traffic includes determining which PDR to use for sending the uplink traffic from a PDR list for the PFCP session.

3. The method of claim 1 wherein using the PDR to remove any tunneling protocol header includes using the PDR to remove any S1-U GPRS tunneling Protocol User (GTPU) header.

4. The method of claim 1 wherein finding the PGW PDRs for this TEID includes using the PGW S5-U TEID from the corresponding SGW FAR to find the PGW PDRs.

5. The method of claim 1 wherein identifying a PGW PDR matching with the current packet is done based on PDR precedence.

6. The method of claim 1 wherein performing any packet encapsulation includes using the PGW FAR pointed out by selected PGW PDR for performing any specific packet encapsulation.

7. A method for linking Packet Detection Rules (PDRs) for optimizing throughput of combined Serving Gateway (SGW)/Packet Gateway (PGW) architecture, the method comprising:
    determining a SGW and a PGW are co-located on a system and when the SGW and PGW are co-located on a same system then performing a Packet Forwarding Control Protocol (PFCP) session lookup for a downlink packet at the PGW, wherein performing a Packet Forwarding Control Protocol (PFCP) session lookup includes performing a Packet Forwarding Control Protocol (PFCP) session lookup based on a Tunnel End Point Identifier (TEID);
    identifying a PGW PDR;
    using the PDR to remove any specific packet headers;
    checking the PDR to determine if the next hop is local;
    when the next hop is local, then using the TEID to find the SGW PDRs;

performing header encapsulation; and after performing outer checksum calculations, sending the packet.

8. The method of claim 7 wherein identifying a PGW PDR includes identifying a PGW PDR based on PDR precedence.

9. The method of claim 7 wherein using the PDR to remove any packet headers includes using the PDR to remove any SGi specific packet headers.

10. The method of claim 7 wherein using the TED from the corresponding SGW FAR to find the SGW PDRs for this TED includes using the SGW FAR pointed out by selected SGW PDR.

11. The method of claim 7 wherein performing SGi GTPU header encapsulation includes using the SGW FAR pointed out by selected SGW PDR.

12. The method of claim 7 wherein performing outer checksum calculations includes performing outer IP/UDP checksum calculations.

13. The method of claim 7 wherein sending the packet includes sending the packet out of SGW over S1-U.

* * * * *